UNITED STATES PATENT OFFICE.

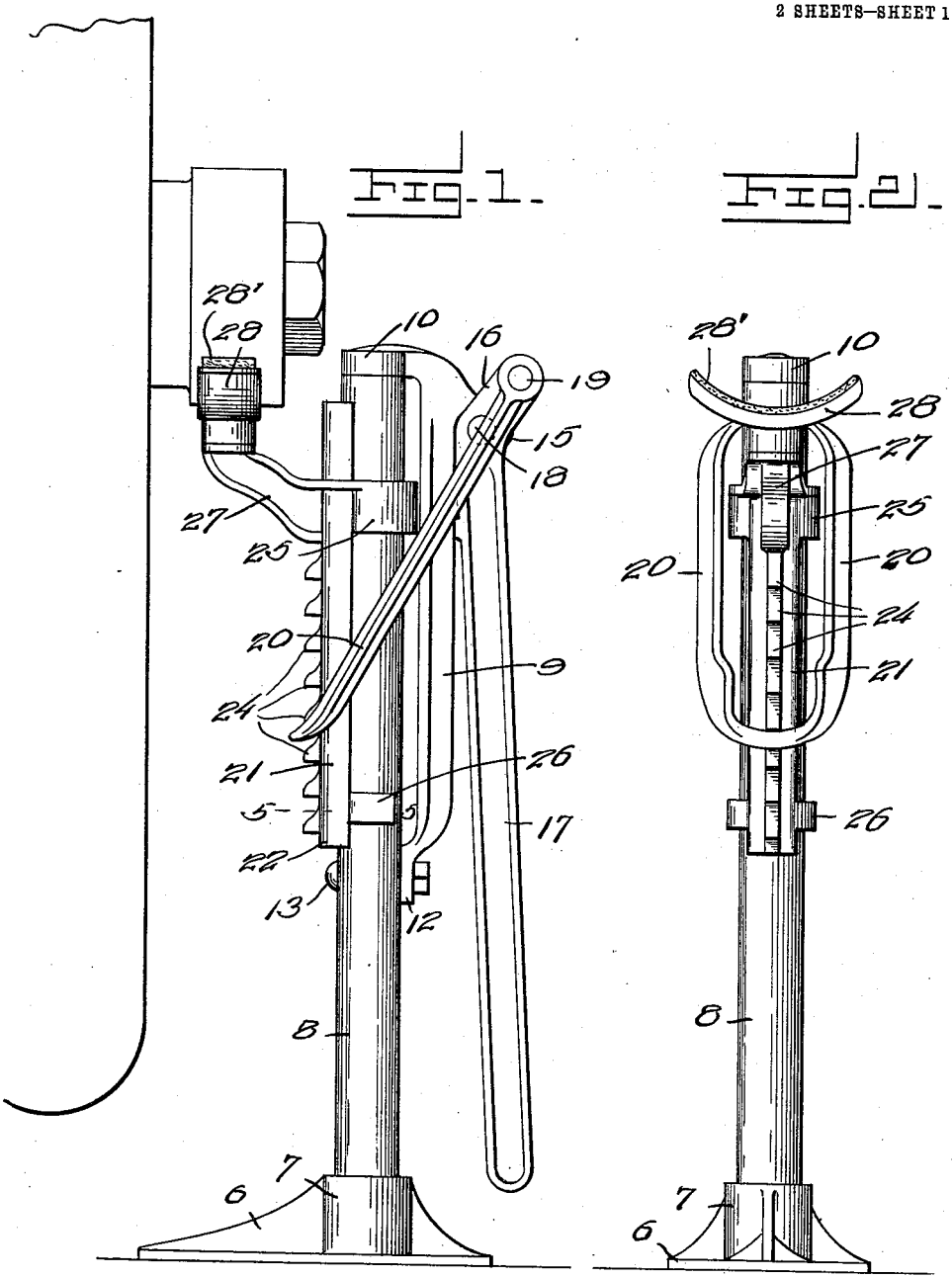

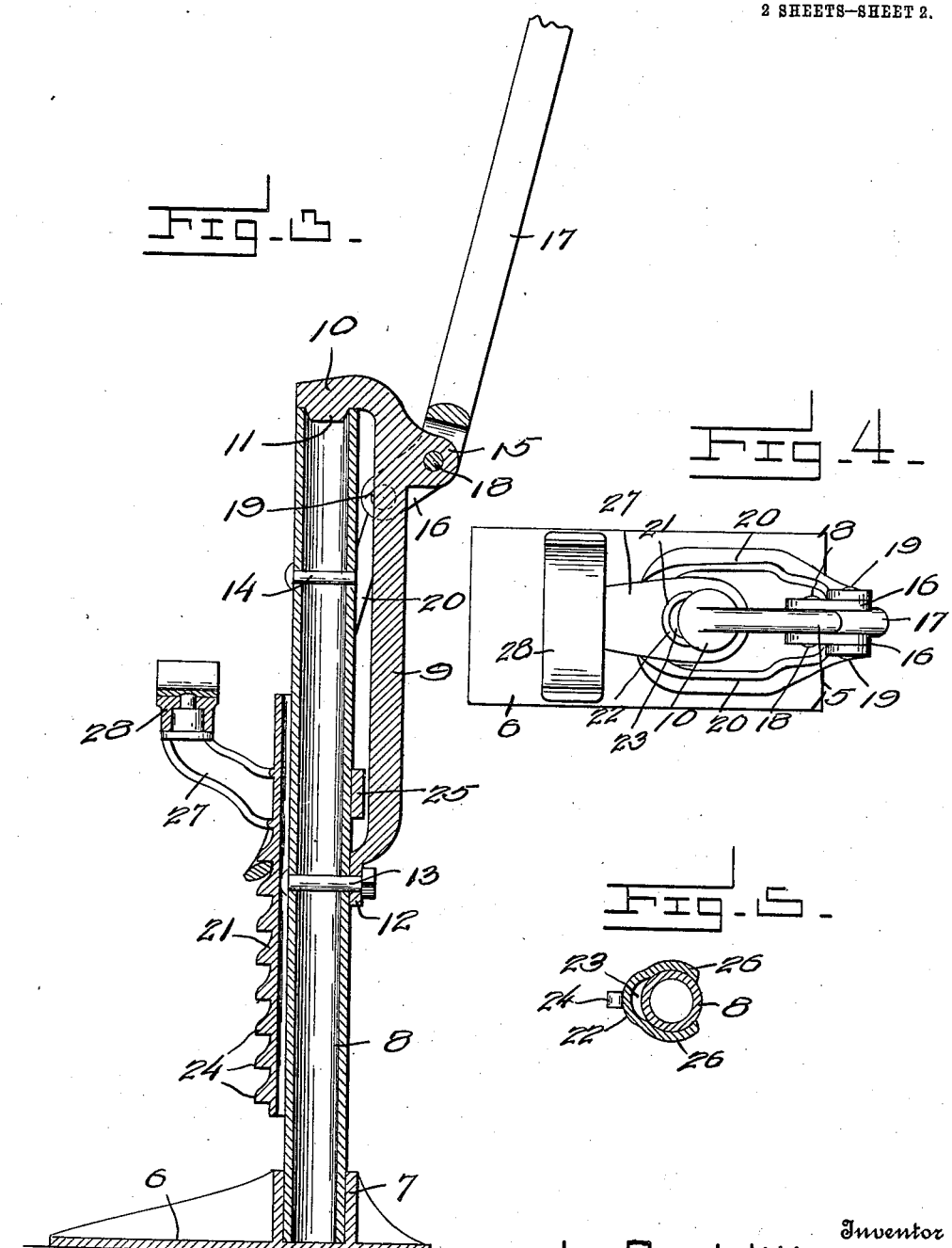

LE ROY WILLOUR, OF ASHLAND, OHIO, ASSIGNOR TO THE ASHLAND MANUFACTURING COMPANY, OF ASHLAND, OHIO, A CORPORATION OF OHIO.

TIRE-SAVER.

1,071,378.  Specification of Letters Patent.  Patented Aug. 26, 1913.

Application filed January 6, 1913.  Serial No. 740,509.

*To all whom it may concern:*

Be it known that I, LE ROY WILLOUR, a citizen of the United States, residing at Ashland, in the county of Ashland and State of Ohio, have invented certain new and useful Improvements in Tire-Savers, of which the following is a specification.

My invention relates broadly to lifting jacks and has particular reference to devices of this character which are known in the art as "tire savers."

An important object of this invention is to provide a tire saver of simple construction, which is strong and is capable of standing rough treatment, without being broken or otherwise damaged.

A further object of my invention is to provide a device of the above mentioned character, the operating parts of which are permanently connected in their assembled condition and will not come apart when the device is thrown around.

A further object of the invention is to provide novel means for attaching the support or supporting bracket upon the upright or standard.

It is well known that a great saving in tires may be had by elevating the automobile or vehicle to bring the tires out of engagement with the floor, when the automobile is not in use. Quite a saving in the tires is had by elevating the automobile to take the strain off of the tires over night. When an automobile is not to be used for quite a long time, such as one month or more, it is obvious that the saving in tires will be even more great. In this case some of the air may be let out of the tires to relieve them of the excessive pressure. I am aware that devices known as "tire savers" have heretofore been employed for this purpose. These "tire savers" have heretofore been constructed so weak that they cannot withstand the very rough treatment that they receive around a garage. It has been customary to cast the standard or upright of these "tire savers." In order that the "tire saver" may not be too heavy or cumbersome the manufacturers have endeavored to reduce their weight at the expense of their strength. When these "tire savers" are carelessly thrown about the garage, it not infrequently happens that the standards or other parts of the same break. A further disadvantage to be encountered in the use of "tire savers" heretofore manufactured, is that the different operating parts thereof fall apart when the device is laid or thrown upon the floor. In view of the present state of the art, as hereinabove briefly outlined, it is obvious that there is a great demand for a tire saver which is free from the disadvantages above stated.

In the accompanying drawings forming a part of this specification and in which like numerals are employed to designate like parts throughout the same, Figure 1 is a side view of the tire saver shown holding a wheel elevated, Fig. 2 is a forward face view of the same, Fig. 3 is a central longitudinal sectional view through the same, Fig. 4 is a plan view of the device, and, Fig. 5 is a horizontal sectional view taken on line 5—5 of Fig. 1.

In the drawings, wherein for the purpose of illustration, I have shown a preferred embodiment of my invention, the numeral 6 designates a shoe or base, provided with an upstanding tubular socket 7, for snugly receiving the lower end of a pipe or tubular standard or upright 8, as shown. This standard is formed of a section of a pipe, which construction is found to be very strong, durable and light.

The numeral 9 designates a support or supporting bracket, provided at its upper end with a horizontal extension or arm 10, carrying a depending extension or boss 11, which extends into the inner end of the pipe-standard 8, as shown. The term extension as applied to the part 11 is intended to cover either a boss formed integral with the arm 10 or a pin, bolt or the like, connected with or passing through the arm 10. At its lower end the support or supporting bracket 9 is provided with an inwardly off set portion 12, apertured to receive a transverse bolt 13 or the like passing through the standard 8. In this manner the support or supporting bracket 9 is securely and permanently connected with the pipe-standard 8 and is retained parallel and suitably spaced therefrom, as shown. The numeral 14 designates a second transverse bolt, extending through the pipe-standard 8, and disposed above and suitably spaced from the first named bolt. Attention is called to the fact that the heads of the bolts 13 and 14 are disposed upon the same side of the pipe-standard 8 and are in the same plane, to serve as a spline for a part to be described.

The support or supporting bracket 9 is provided near its upper end with an ear or lateral extension 15, which is received by the upper forked end 16 of an operating lever 17, such parts being pivotally connected by means of a bolt, pin or rivet 18, as shown. The upper forked end 16 of the operating lever is disposed at an angle with relation to the operating lever and the same carries outwardly extending trunnions 19, which fit within the apertured outer ends of a U-shaped operating element 20. This U-shaped element surrounds or incloses the pipe-standard 8, as shown.

Vertically movably mounted upon the pipe-standard 8 opposite the support or supporting bracket 9 is a lift-element 21, which is curved in cross section to conform to the curvature of the pipe-standard 8. This lift-element is provided with an outwardly extending longitudinal portion 22, forming a longitudinal recess or pocket 23, adapted to receive the heads of the bolts 13 and 14. It is thus seen that the heads of the bolts 13 and 14 serve as a spline for the lift-element 21 and prevent the same from turning perceptibly upon the pipe-standard 8 but allow the same to move freely longitudinally thereof. The longitudinal portion 22 is provided with teeth 24, which are engaged by the transverse portion of the U-shaped operating element 20, as shown. The lift-element 21 is provided near its upper and lower ends with rings 25 and 26, which surround the pipe-standard 8, as shown. The lower ring 26 is split or cut away, as more clearly shown in Figs. 1 and 3, whereby the same may pass the off set extension 12 of the support or supporting bracket 9. The ring 25 retains the lift-element 21 permanently upon the pipe-standard 8, the same operating within the space between the support or supporting bracket 9 and the pipe-standard 8, as shown.

Formed upon the upper end of the lift-element 21 is a laterally extending arm 27, carrying a swiveled head 28, which is preferably lined upon its engaging surface with a strip of leather 28′ or the like, to engage the hub of a wheel.

As the elements 6, 20, 21, and 9 are the most liable to be broken, I preferably make the same of brass. Of course I do not wish to in any way restrict myself to making these parts of brass alone, as any other suitable strong metal may be used. The standard or upright 8 is preferably formed of a section of an iron pipe, and the operating lever 17 is also preferably formed of iron. Ordinarily the pipe-standard 8 will fit sufficiently tight or snug within the socket 7 to prevent the shoe or base 6 from coming off of the same. I may however provide a bolt or rivet (not shown) to securely hold these parts together, if it is found necessary.

In the use of my tire saver, the same is placed in a suitable position with relation to the wheel, as shown in Fig. 1, the operating lever 17 elevated and the lift-element 21 moved vertically until the head 28 engages the hub of the wheel. The operating lever 17 is then swung downwardly, to elevate the load and subsequently hold the same in the elevated position.

It is to be understood that the form of my invention herewith shown and described is to be taken as a preferred example of the same, and that certain changes in the shape, size, and arrangement of parts may be resorted to without departing from the spirit of my invention or the scope of the subjoined claims.

Having fully described my invention, I claim:—

1. In apparatus of the character described, the combination with a tubular standard, of a supporting bracket extending longitudinally of the tubular standard for a considerable portion of the length thereof and provided at its upper end with a depending extension for insertion within the upper end of the tubular standard, a lift element slidably mounted upon the tubular standard and provided with a longitudinal recess, an element attaching the lower end of the supporting bracket with the tubular standard and extending therebeyond to enter the longitudinal recess of the lift element to spline the same with the tubular standard, and means mounted upon the supporting bracket to raise and lower the lift element.

2. In a device of the character described, a substantially cylindrical standard, a lift element slidably mounted upon the standard and formed curved in cross section to conform to the curvature of the standard and provided with a longitudinally extending pocket, a supporting bracket extending longitudinally of the substantially cylindrical standard and provided at its upper end with a depending boss fitting within an opening formed in the standard, a transverse bolt passing through the standard and engaging the lower portion of the supporting bracket and having its head operating within the longitudinal pocket to serve as a spline for the lifter, a plurality of teeth formed upon the lift element, an operating lever pivotally mounted upon the supporting bracket, and an operating element engaging the teeth and pivotally connected with the operating lever.

3. In a device of the character described, a pipe-standard, a lift element slidably mounted thereon and formed curved in cross section to correspond to the curvature of the pipe-standard and provided with a longitudinal pocket, a suitable number of transverse bolts connected with the pipe-standard with their heads disposed to extend within the longitudinal pocket of the lift-element to serve as a spline therefor, and means to raise and lower the lift-element.

In testimony whereof I affix my signature in presence of two witnesses.

LE ROY WILLOUR.

Witnesses:
   Thos. H. Moore,
   C. W. Charpaning.

Copies of this patent may be obtained for five cents each, by addressing the "Commissioner of Patents, Washington, D. C."